(12) United States Patent
Teylor

(10) Patent No.: US 10,499,764 B2
(45) Date of Patent: Dec. 10, 2019

(54) AUTONOMOUS HYDRAULIC UNIT

(71) Applicant: Adrian Alberto Teylor, Barcelona (ES)

(72) Inventor: Adrian Alberto Teylor, Barcelona (ES)

(*) Notice: Subject to any disclaimer, the term of this patent is extended or adjusted under 35 U.S.C. 154(b) by 382 days.

(21) Appl. No.: 15/619,445

(22) Filed: Jun. 10, 2017

(65) Prior Publication Data
US 2017/0360249 A1 Dec. 21, 2017

(30) Foreign Application Priority Data
Jun. 16, 2016 (ES) ................. 201630785 U

(51) Int. Cl.
*A47J 31/46* (2006.01)
*F04B 17/04* (2006.01)
*F04B 23/02* (2006.01)
*F04B 53/16* (2006.01)
*H05B 1/02* (2006.01)
*H05B 3/00* (2006.01)
*H05B 6/12* (2006.01)

(52) U.S. Cl.
CPC ............. *A47J 31/46* (2013.01); *F04B 17/04* (2013.01); *F04B 17/044* (2013.01); *F04B 23/026* (2013.01); *F04B 53/16* (2013.01); *H05B 1/0261* (2013.01); *H05B 3/0076* (2013.01); *H05B 6/1209* (2013.01); *H05B 2213/07* (2013.01)

(58) Field of Classification Search
None
See application file for complete search history.

(56) References Cited

U.S. PATENT DOCUMENTS

| 4,300,870 A * | 11/1981 | Cox ..................... A47J 31/542 392/471 |
| 4,594,500 A * | 6/1986 | Wright ............... F04D 29/5866 165/108 |
| 5,408,960 A * | 4/1995 | Woytowich ............... B60L 1/02 123/142.5 E |
| 5,701,388 A * | 12/1997 | Steinhardt ........... A61H 33/0095 392/471 |
| 6,275,655 B1 * | 8/2001 | Rixen ..................... B60N 3/18 392/465 |
| 6,415,103 B2 * | 7/2002 | Bresolin ............... A01K 63/065 210/184 |
| 6,600,875 B2 * | 7/2003 | Kodden ................. A47J 31/545 219/490 |
| 6,970,645 B1 * | 11/2005 | Wang ................... A01K 63/065 392/499 |
| 7,287,536 B2 * | 10/2007 | Steck ................... A47L 15/4225 134/107 |
| 7,302,170 B1 * | 11/2007 | Chen ....................... F22B 1/282 392/398 |
| 7,327,950 B2 * | 2/2008 | Cohen ..................... F24D 17/00 392/461 |

(Continued)

*Primary Examiner* — Thor S Campbell

(57) ABSTRACT

Autonomous hydraulic unit comprising a liquid inlet (1); a flow meter (2) which is jointly attached to an inlet (3) of a compression chamber (4) of a pump (5) where a piston (6) injects the compressed liquid through a nozzle (7) into a heating chamber (8).

A plastic body (9) integrates in one piece the compression chamber (4), a self-priming valve (10) and a safety valve (11). A heating element (12) contained within a body (9) determines with a disk (14) the heating chamber (8) where the temperature of the liquid injected by the piston (6) is raised in its passage towards the outlet (13).

3 Claims, 2 Drawing Sheets

(56) References Cited

U.S. PATENT DOCUMENTS

| | | | | |
|---|---|---|---|---|
| 7,803,208 B2* | 9/2010 | Kawasaki | B01D 45/06 | 55/434 |
| 7,946,218 B2* | 5/2011 | Weijers | A47J 31/0647 | 99/300 |
| 8,245,718 B2* | 8/2012 | Busing | A47L 15/4225 | 134/108 |
| 8,422,869 B2* | 4/2013 | Joseph | A63J 5/025 | 392/386 |
| 8,437,626 B2* | 5/2013 | Ding | F24D 3/08 | 392/307 |
| 8,503,870 B2* | 8/2013 | Gaulard | F24H 9/2028 | 392/465 |
| 8,850,957 B2* | 10/2014 | Aemisegger | A47J 31/3623 | 29/469 |
| 8,989,566 B2* | 3/2015 | Liu | F04D 29/426 | 392/465 |
| 9,297,553 B2* | 3/2016 | Vallejo Noriega | F04D 29/586 | |
| 9,775,463 B2* | 10/2017 | Jarisch | A23F 5/26 | |
| 10,213,085 B2* | 2/2019 | Vallejo Noriega | A47L 15/4206 | |
| 10,260,505 B2* | 4/2019 | Block | F04D 29/426 | |
| 2008/0044168 A1* | 2/2008 | Eichholz | D06F 39/04 | 392/471 |
| 2013/0206014 A1* | 8/2013 | Jarisch | A47J 31/407 | 99/295 |
| 2016/0150911 A1* | 6/2016 | Upston | A47J 31/46 | 99/285 |

* cited by examiner

AUTONOMOUS HYDRAULIC UNIT

BACKGROUND

The present invention relates to an autonomous hydraulic unit for various applications which require moving liquids from a point A to a point B increasing in said displacement the temperature and/or pressure of the liquid such as coffee or tea machines. The unit object of this invention consists of an entry point of the liquid, a device for measuring the flow rate of liquid flowing through it, a piston pump to move the liquid, an electrical device for heating said liquid, the corresponding thermal sensors to measure the temperature of the displaced liquid and an electronic board to control the operation of the unit.

The autonomous hydraulic unit of this invention has features oriented to integrate in a single device several functions that are usually separated inside the household appliances reducing in this way the necessary space to install those functions as well as the costs of materials and the costs of assembly.

At present, to move liquids, in particular water, with precision and altering their thermodynamic characteristics, different components such as flow meters, pumps, electric heaters and their respective sensors are used. These components are individually mounted on a chassis which can be of metal, plastic or a combination of both materials and are connected between them through tubes and cables to carry out the desired work of displacing and/or heating said liquid.

This situation, despite the effort to optimize the positioning of these components and connections, involves the use of materials such as pipes, cables and requires manual assembly operations that can be avoided if they are integrated into a single device. At the same time it can be eliminated most of the risks of hydraulic leakage and electrical failure between the various connections.

Developing increasingly small and light appliances is a market demand that companies in the sector do not ignore, but finds its limitations in the current technique of assembling on a chassis the various components necessaries to transform the state of water.

Therefore, the technical problem that arises is to integrate the different components necessaries to move and transform the state of the liquid inside the appliances in a single autonomous device reducing by this way the costs of material, labor and dimension of the whole.

SUMMARY

In order to facilitate understanding, the integrated functions are detailed first:

A—Measurement of the flow that is made by means of a flow meter and the measurement of the temperature by means of a NTC.
B—Pumping that is carried out by means of a vibrating piston pump.
C—Heating that is done by means of an electric resistance.
D—Safety that is guaranteed by thermo-fuses, thermostats and mechanical valves.
E—Control and command of the device that is made by means of an electronic card.

The autonomous hydraulic unit, subject of this invention, draws the liquid from a reservoir through a flow meter which measures the volume of liquid entering it, then the pump compresses the liquid and drives it into the heater chamber which increases its temperature to leave said hydraulic chamber at a controlled as well as accurate parameters of pressure, flow and temperature, being this latter state of the liquid the one required by the following process of preparing the hot beverage.

A first feature of the invention is that all of these components are integrally joined together and constitute a compact unit with a single liquid inlet, a single liquid outlet and a single electrical connection.

A second feature of the invention is that the electronic control of the unit is integrated therein.

A third feature is that the security elements of the unit are also integrated in said unit.

The features of the invention will be more readily understood in view of the exemplary embodiment shown in the appended figures.

DESCRIPTION OF THE DRAWINGS

In order to complement the description that is being made and in order to facilitate the understanding of the characteristics of the invention, accompanying to the present specification are figures that, with illustrative and non-limiting character, have been represented as follows.

DETAILED DESCRIPTION

Figure 1:
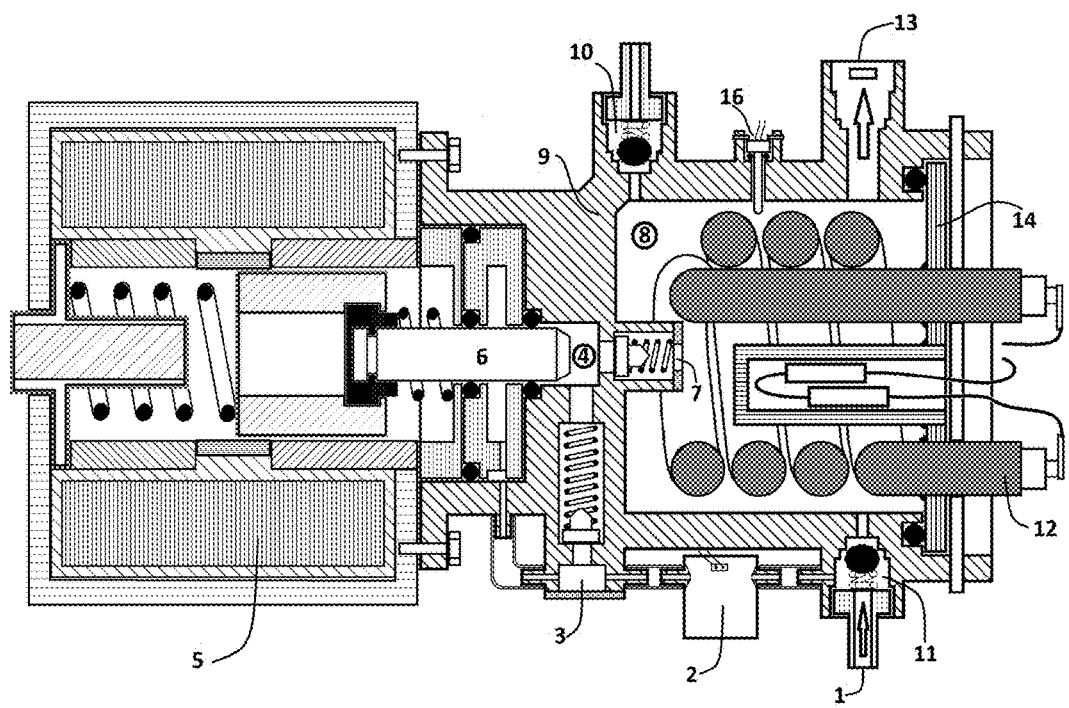
FIG. 1 shows a schematic drawing of an exemplary embodiment of the autonomous hydraulic unit according to the invention, sectioned in a vertical plane.

In the exemplary embodiment shown in FIG. 1 the autonomous hydraulic unit comprises: a liquid inlet (1); a flow meter (2) which is jointly attached to an inlet (3) of a compression chamber (4) of a pump (5) where a piston (6) injects the compressed liquid through a nozzle (7) into a heating chamber (8).

A plastic body (9) integrates in one piece the compression chamber (4), a self-priming valve (10) and a safety valve (11). A heating element (12) contained within the body (9) determines with a disk (14) the heating chamber (8) where the temperature of the liquid injected by the piston (6) is raised up in its passage towards an outlet (13).

Figure 2:
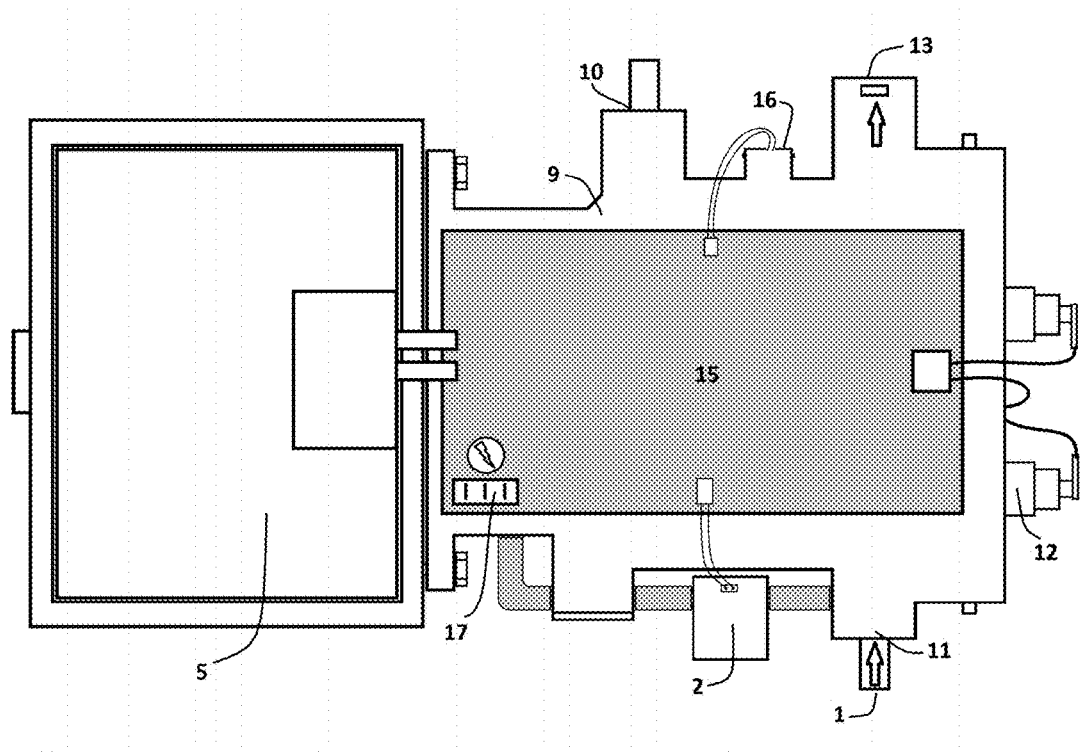
FIG. 2 shows a schematic drawing of an exemplary embodiment of the vibrating pump for liquids according to the invention.

In the exemplary embodiment shown in FIG. 2 the autonomous hydraulic unit integrates an electronic board (15) which is attached to the exterior of the plastic body (9) and processes the information received from the flow meter (2) and the information from a temperature sensor (16) to control the operation of the pump (5) and the heater element (12) to ensure at any time the pressure, flow and temperature characteristics of the liquid driven out through an outlet (13).

According to the invention, and as shown in FIG. 2, the flow meter (2), the vibrating piston pump (5), the heating element (12), the self-priming valve (10), the safety valve (11) and the electronic board (15) are solidly joined by the plastic body (9) constituting a single device with a single liquid inlet (1), a single liquid outlet (13) and a single electrical connection (17) towards the outside.

Figure 3:
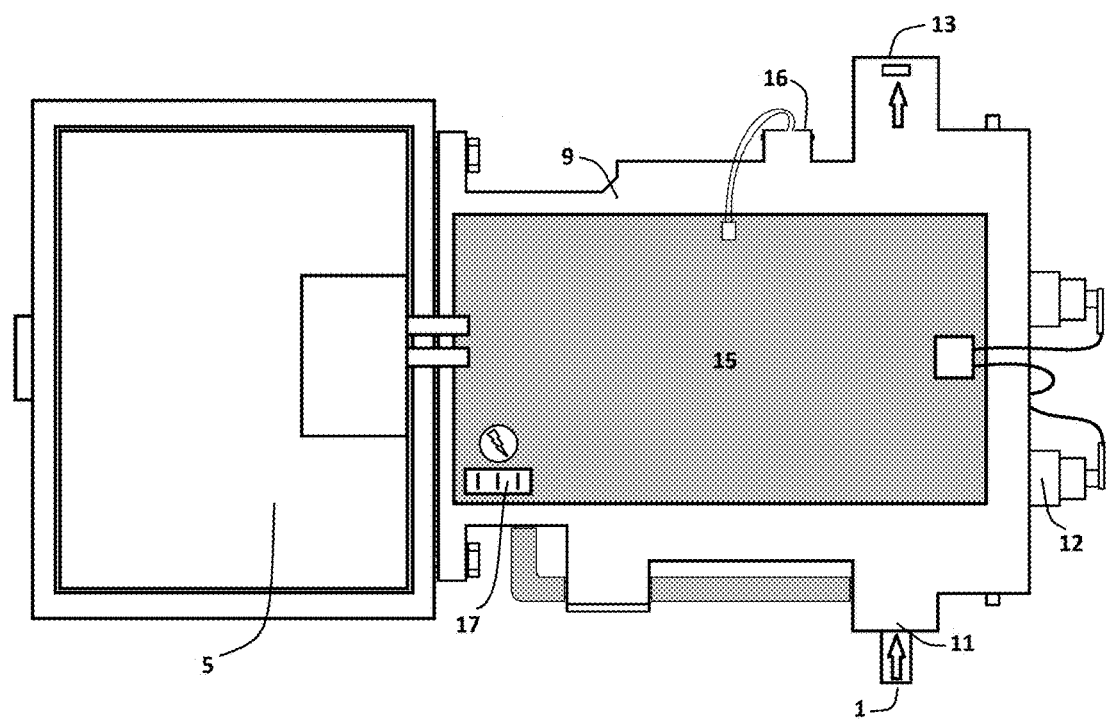
FIG. 3 shows a schematic drawing of an exemplary embodiment of the vibrating pump for liquids according to the invention, simplified without the flow control, sectioned in a vertical plane.

In the variant embodiment shown in FIG. 3, the autonomous hydraulic unit integrates the vibration piston pump (5), the heating element (12), the safety valve (11) and the electronic board (15) constituting a single device with a single liquid inlet (1), a single liquid outlet (13) and a single electrical connection (17).

Figure 4:
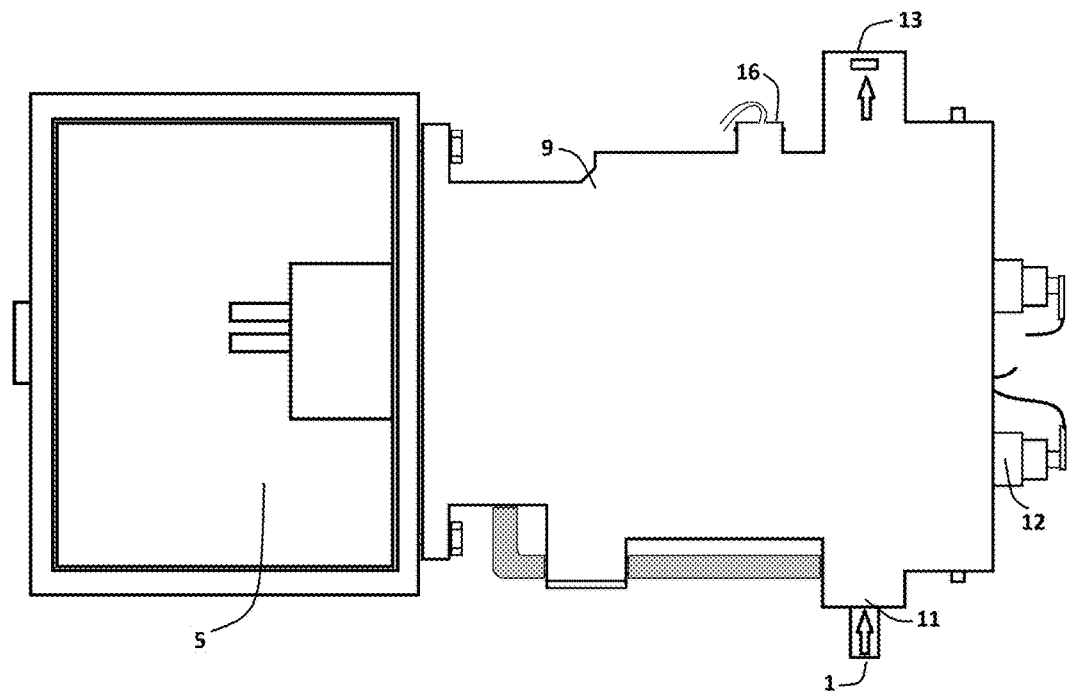
FIG. 4 shows a schematic drawing of an exemplary embodiment of the vibrating pump for liquids according to the invention, simplified without the electronic control, sectioned in a vertical plane.

In the embodiment shown in FIG. 4, the autonomous hydraulic unit integrates the vibrating piston pump (5), the heating element (12) and the safety valve (11) constituting a single device with a single liquid inlet (1) and a single liquid outlet (13).

Having described the nature of the invention sufficiently, as well as a preferred version, it is stated for the appropriate purposes that the materials, shape, size and arrangement of the elements described can be changed, provided this does not involve an alteration of the essential features of the invention claimed below.

The invention claimed is:

1. An autonomous hydraulic unit, applicable in the displacement of liquids and comprising: a liquid inlet (1); a flow meter (2) which is integrally attached to an inlet (3) of a compression chamber (4) of a vibrating pump (5) where a piston (6) injects the compressed liquid through a nozzle (7) inside a heating chamber (8) limited perimetrically and on the left side by a plastic body (9) which in turn integrates the compression chamber (4), a self-priming valve (10), a safety valve (11) and it is limited on the right side by a disk (14) welded to a heating element (12) this last responsible for heating up the liquid in its passage towards an outlet (13); an electronic board (15) which is attached to the exterior of the plastic body (9) processes and uses the information received from the flowmeter (2) and a temperature sensor (16) to control the operation of the vibrating pump (5) and the heating element (12) ensuring at any time the characteristics of pressure, flow rate and temperature of the liquid driven out through an outlet (13); Characterized in that: the flow meter (2), the vibrating piston pump (5), the heating element (12), the self-priming valve (10), the safety valve (11) and the electronic board (15) are integrally joined by the plastic body (9) constituting a single device with a single inlet of the liquid (1), a single outlet of the liquid (13) and a single electrical connection (17) towards the outside.

2. An autonomous hydraulic unit, applicable in the displacement of liquids according to claim 1; Characterized in that: the vibrating pump (5), the heating element (12), the safety valve (11) and the electronic board (15) are integrally connected by the plastic body (9) constituting a single device with a single liquid outlet (1), a single outlet of the liquid (13) and a single electrical connection (17) towards the outside.

3. An autonomous hydraulic unit, applicable in the displacement of liquids according to claim 1; Characterized in that: the vibrating pump (5), the heating element (12) and the safety valve (11) are integrally connected by the plastic body (9) constituting a single device with a single inlet of the liquid (1) and a single outlet of the liquid (13).

\* \* \* \* \*